US008853350B1

(12) United States Patent
Anderson

(10) Patent No.: US 8,853,350 B1
(45) Date of Patent: Oct. 7, 2014

(54) SYNTHESIS OF POLYOXOMETALATE-LOADED EPOXY COMPOSITES

(71) Applicant: Sandia Corporation, Albuquerque, NM (US)

(72) Inventor: Benjamin J. Anderson, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 170 days.

(21) Appl. No.: 13/625,969

(22) Filed: Sep. 25, 2012

(51) Int. Cl.
  *C08G 59/68* (2006.01)
(52) U.S. Cl.
  USPC ............. 528/407; 522/64; 522/66; 528/89; 528/92; 528/410; 528/411
(58) Field of Classification Search
  None
  See application file for complete search history.

(56) References Cited

U.S. PATENT DOCUMENTS 4,603,157 A * 7/1986 Asai et al. .................. 523/440

OTHER PUBLICATIONS

Katsoulis, D.E., "A Survey of Applications of Polyoxometalates", Chemical Reviews, 1998, pp. 359-387, vol. 98.
Tan, L. et al., "Polyimide/polyoxometalate copolymer thin films: synthesis, thermal and dielectric properties", Polymers for Advanced Technologies, 2010, pp. 435-441, vol. 21.
Chabanne, P. et al., "Epoxy Polymerization Initiated by BF3-Amine Complexes. I. Synthesis and Characterization of BF3-Amine Complexes and BF3-Amine Complexes Dissolved in -Butyrolactone", Journal of Applied Polymer Science, 1993, pp. 685-699, vol. 49.
Park, S. J.et al., "Cationic Cure of Epoxy Resin Initiated by Methylanilinium Salts as a Latent Thermal Initiator", Journal of Polymer Science:Part B, 2001, pp. 2397-2406, vol. 39.
Zhou, Y. et al., "One-Component, Low-Temperature, and Fast Cure Epoxy Encapsulant With High Refractive Index for Led Applications", IEEE Transactions on Advanced Packaging, 2008, pp. 484-489, vol. 31, No. 3.
Morio, K. et al., "Thermoinitiated Cationic Polymerization of Epoxy Resins by Sulfonium Salts", Journal of Applied Polymer Science, 1986, pp. 5727-5732, vol. 32.
Long, De-Liang et al., "Polyoxometalates: Building Blocks for Functional Nanoscale Systems", Angewandte Chemie International Edition, 2010, pp. 1736-1758, vol. 49.
Proust, A. et al., "Functionalization of polyoxometalates: towards advanced applications in catalysis and materials science", Chemical Communications, 2008, pp. 1837-1852.
Bednarek, M. et al., "Heteropolyacids—new efficient initiators of cationic polymerization", Die Makromolekulare Chemie, 1989, pp. 929-938, vol. 190.
Wu, Q. et al., "The linear relations and living feature in cationic ring-opening copolymerization of epoxy/THF system", Colloid Polymer Science, 2008, pp. 761-767, vol. 286.
Yu, Y. et al., "Simultaneous cationic polymerization and esterification of epoxy/anhydride system in the presence of polyoxometalate catalyst", Polymer, 2010, pp. 1563-1571, vol. 51.
Drago, R. S. et al., "An Acidity Scale for Bronsted Acids Including H3PW12O40", Journal of the American Chemical Society, 1997, pp. 7702-7710, vol. 119.
Izumi, Y. et al., "Alkali metal salts and ammonium salts of Keggin-type heteropolyacids as solid acid catalysts for liquid-phase Friedel-Crafts reactions", Applied Catalysis A: General, 1995, pp. 127-140, vol. 132.
Sathicq, A. et al., "Heterocyclic amine salts of Keggin heteropolyacids used as catalyst for the selective oxidation of sulfides to sulfoxides", Tetrahedron Letters, 2008, pp. 1441-1444, vol. 49.
Kubisa, P. et al., "Cationic activated monomer polymerization of heterocyclic monomers", Progress in Polymer Science, 1999, pp. 1409-1437, vol. 24.
Matejka, L. et al., "Cationic Polymerization of Diglycidyl Ether of Bisphenol A. II. Theory", Journal of Polymer Science Part A, 1997, pp. 651-663, vol. 35.
Chabanne, P. et al., "Monoepoxy Polymerization Initiated by BF3-Amine Complexes in Bulk. II. Influence of Water and By-Products on Polymer Formation", Journal of Applied Polymer Science, 1994, pp. 769-785, vol. 53.
Bouillon, N. et al. "Epoxy prepolymers cured with boron trifluoride-amine complexes, 2 a) Polymerization mechanisms", Die Makromolekulare Chemie, 1990, pp. 1417-1433, vol. 191.
Mateva, R. et al., "Copolymerization of Trioxane with Phenylglycidylether", Journal of Polymer Science: Part A: Polymer Chemistry, 1988, pp. 511-519, vol. 26.
Gouzerh, P. et al., "Main-Group Element, Organic, and Organometallic Derivatives of Polyoxometalates", Chemical Review, 1998, pp. 77-111, vol. 98.

* cited by examiner

*Primary Examiner* — Robert Sellers
(74) *Attorney, Agent, or Firm* — Kevin W. Bieg

(57) ABSTRACT

The synthesis of a polyoxometalate-loaded epoxy uses a one-step cure by applying an external stimulus to release the acid from the polyoxometalate and thereby catalyze the cure reaction of the epoxy resin. Such polyoxometalate-loaded epoxy composites afford the cured epoxy unique properties imparted by the intrinsic properties of the polyoxometalate. For example, polyoxometalate-loaded epoxy composites can be used as corrosion resistant epoxy coatings, for encapsulation of electronics with improved dielectric properties, and for structural applications with improved mechanical properties.

7 Claims, 12 Drawing Sheets

US 8,853,350 B1

SYNTHESIS OF POLYOXOMETALATE-LOADED EPOXY COMPOSITES

STATEMENT OF GOVERNMENT INTEREST

This invention was made with Government support under contract no. DE-AC04-94AL85000 awarded by the U.S. Department of Energy to Sandia Corporation. The Government has certain rights in the invention.

FIELD OF THE INVENTION

The present invention relates to epoxy thermosets and, in particular, to the synthesis of polyoxometalate-loaded epoxy composites.

BACKGROUND OF THE INVENTION

Epoxy thermosets have wide commercial importance from use in automotive, medical, electronics, aerospace, and construction. They are used as adhesives to reliably bond assemblies, as encapsulants to offer environmental protection and shock mitigation, and in structural composites to improve strength and reduce weight compared to traditional metal. Some applications compound epoxies with fillers to improve mechanical (silica and alumina), thermal (silica), and electrical (silver) properties making the epoxies more durable and reliable in specific applications. Most fillers range in size from several hundred nanometers to several microns. However, over the past decade, compounding epoxies with nano-sized fillers has led to a new type of nanocomposite material with properties that can differ from traditional particulate filled composite materials. See Y. Sun et al., *J. Polym. Sci. Part B: Polym. Phys.* 42, 3849 (2004); S. Jiguet et al., *Surf. Coat. Technol.* 201, 2289 (2006); H. Zhang et al., *Acta Mater.* 54, 1833 (2006); S. T. Knauert et al., *J. Polvm. Sci. Part B: Polym. Phys.* 45, 1882 (2007); and Y. L. Liang and R. A. Pearson, *Polymer* 50, 4895 (2009).

However, a need remains for a one-part epoxy system that can provide novel epoxy nanocomposite materials.

SUMMARY OF THE INVENTION

The present invention is directed to a method of synthesis of polyoxometalate-loaded epoxy, comprising adding a polyoxometalate to an epoxy resin and applying an external stimulus to release the acid from the polyoxometalate and thereby catalyze the cure reaction of the epoxy resin. The polyoxometalate can comprise an isopolyacid, heteropolyacid, or molybdenum compound. The heteropolyacid can comprise a Keggin structure having a chemical formula of $[H_nXM_{12}O_{40}]$ or a Dawson structure having a chemical formula $[H_nX_2M_{18}O_{62}]$, wherein X is a 4A-5A element, such as P or S, and M is an IVB-VIB transition metal, such as V, Nb, Mo, or W. The heteropolyacid can comprise a phosphotungstate, silicotungstate, phosphomolybdate, silicomolybdate, lacunary structures thereof, or a transition metal, organo-metal, and silane type substituted derivatives thereof. The polyoxometalate can be complexed with an organic base. The epoxy resin preferably has a $pK_a$ greater than 7. For example, the epoxy resin can comprise N,N-diglycidyl-4-glycidyloxyaniline resin. For example, the external stimulus comprises a photo or thermal stimulus.

As an example of the present invention, a phosphotungstate (PTA) heteropolyacid was used to catalyze the cationic homopolymerization of a N,N-diglycidyl-4-glycidyloxyaniline epoxy resin to form a polyoxometalate-loaded epoxy composite. The polyoxometalate is dispersable in an epoxy resin. Dispersion is driven by formation of a POM-resin complex which is soluble in the resin. The acidic character of PTA enables the POM to promote cationic homopolymerization of the epoxy resin in a manner similar to other thermal latent Lewis acid catalyzed systems. As described below, the cure reaction propagates through two cure regimes. A fast cure at short time is identified as propagation by an activated chain end (ACE) mechanism. A slow cure at long time is identified as propagation by an activated monomer (AM) mechanism. The activation energies for the fast and slow cure regimes agree well with other systems that have been confirmed to propagate by the ACE and AM mechanisms. The polyoxometalate remains dispersed indefinitely, from dispersion of the polyoxometalate in the liquid epoxy resin to cure of the epoxy into a thermoset, with no evidence of aggregation, which is a common problem in the synthesis of nanocomposite materials.

Polyoxometalate-loaded epoxy composites afford the cured epoxy unique properties imparted by the intrinsic properties of the polyoxometalate. Polyoxometalates are able to accept multiple electrons while maintaining their structure and are active toward cationic corrosive salts revealing a capability to neutralize these corrosive agents and offering use of polyoxometalate-loaded epoxy composites in corrosion resistant epoxy coatings. See D. E. Katsoulis, *Chemical Reviews* 98, 359 (1998). Polyoxometalates also reduce the dielectric constant and the dielectric loss of polyoxometalate-loaded polymers. See L. Tan et al., *Polymers for Advanced Technologies* 21, 435 (2010). This fact suggests the synthesis of epoxy potting compounds for encapsulation of electronics with improved dielectric properties over neat epoxies. Polyoxometalates also influence the mechanical and thermal properties of the cured epoxy shown by an increase in modulus and a reduction in glass transition temperature and coefficient of thermal expansion. The change in material properties can be dramatic, even at low polyoxometalate loadings and can be advantageous in structural applications.

BRIEF DESCRIPTION OF THE DRAWINGS

The detailed description will refer to the following drawings, wherein like elements are referred to by like numbers.

DETAILED DESCRIPTION OF THE INVENTION

Figure 1:
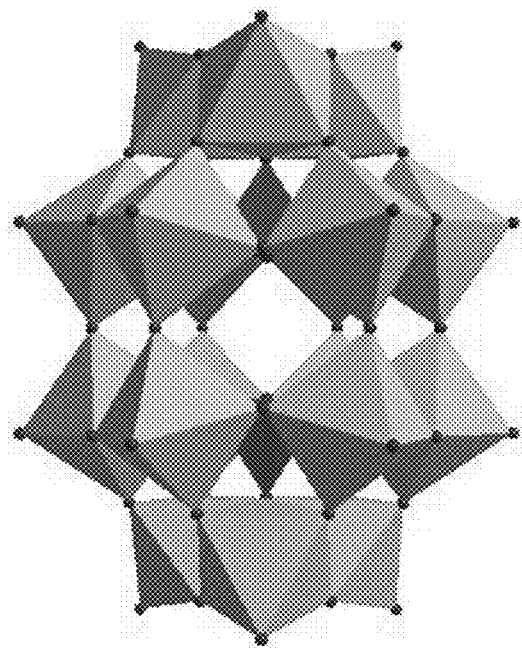
FIG. 1 shows the Keggin $[H_nXM_{12}O_{40}]$ and the Dawson $[H_nX_2M_{18}O_{62}]$ polyoxometalate.
Figure 1:
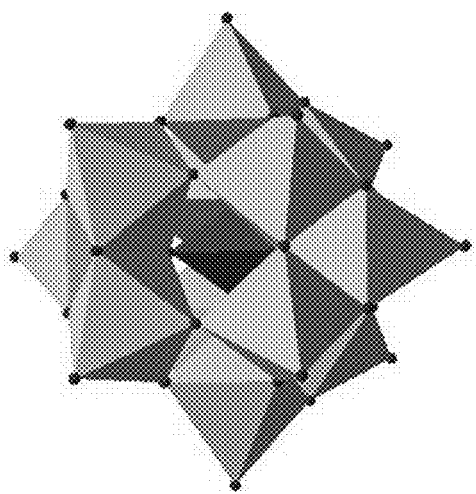

Epoxy resin systems are traditionally formulated as two part systems composed of an epoxy resin and a hardener, amines and anhydrides are most common. See E. M. Petrie, *Epoxy Adhesive Formulations*, McGraw-Hill: New York (2006). More recently, one part epoxy systems have been developed that release a Lewis acid that initiates cationic homopolymerization of the epoxy resin. See P. Chabanne et al., *J. Appl. Polym. Sci.* 49, 685 (1993); S.-J. Park et al., *J. Polym. Sci. Part B: Polvm. Phys.* 39, 2397 (2001); Z. Yan et al., *IEEE Trans. Adv. Packaging* 31, 484 (2008); and K. Morio et al., *J. Appl. Polym. Sci.* 32, 5727 (1986). Lewis acid catalyzed cationic homopolymerization relies on the release of an acidic proton to initiate the cure reaction. The Lewis acid is initially inactivated commonly by forming a complex with a second species. Upon application of an external stimulus, the acid is released and promotes initiation of the cure reaction. Typical commercial systems utilize photo or thermal stimulated release of an acid to initiate the cure reaction.

The kinetics of cationic homopolymerization of epoxy resins is well established. See S. Penczek, *J. Polym. Sci. Part A: Polym. Chem.* 38, 1919 (2000); and S. Penczek et al., *Makromol. Chem., Macromol. Symp.* 3, 203 (1986). The polymerization reaction is described in terms of two competing propagation mechanisms: the activated chain end (ACE) and activated monomer (AM). The ACE mechanism is fast, and propagation occurs by reaction of a tertiary oxonium ion with a glycidyl group of the epoxy resin which reforms the tertiary oxonium ion at the activated end of the propagating polymer chain, Eq. (1).

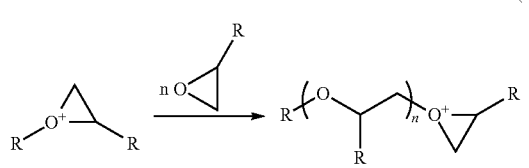

(1)

The AM mechanism is slow, and propagation occurs through reaction of a hydroxyl at the opposing terminus of the propagating polymer chain with a secondary oxonium ion which reforms the hydroxyl and yields an acidic proton, Eq. (2). Protonation of another glycidyl group recreates a secondary oxonium ion.

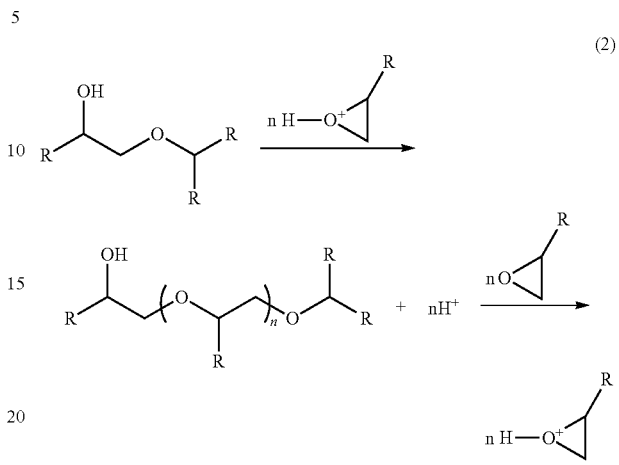

(2)

Polyoxometalates (POMs) are a novel class of metal oxide nanoclusters that exist between mononuclear metalates and bulk metal oxide particles. See D.-L. Long, *Angew. Chem. Int. Ed.* 49, 1736 (2010); A. Proust et al., *Chem. Commun.,* 1837 (2008); and P. Gouzerh and A. Proust, *Chem. Rev.* 98, 77 (1998). POMs behave as Lewis acids and readily disassociate in polar solvents giving them a very strong Bronsted activity. See M. T. Pope, In *Polyoxometalate Molecular Science*; Borrás-Almenar, J. J.; Coronado, E.; Müller, A.; Pope, M. T., Eds.; Kluwer Academic Publishers: Dordrecht (2003). The nature of POMs to act as a Lewis acid suggests that they may serve as effective catalysts of cationic homopolymerization of epoxy resins. POMs are most commonly formed from 4B-6B transition metals and have a wide variety of structures. See D.-L. Long, *Angew. Chem. Int. Ed.* 49, 1736 (2010). Much work has been done on utilizing the acidic character of POMs to improve efficiency and yield in laboratory and industrial processes: chemical synthesis, redox reactions and separation processes. See A. K. Cuentas-Gallegos et al., *Adv. Funct. Mater.* 15, 1125 (2005); M. M. Heravi and S. J. Sadjadi, *Iran. Chem. Soc.* 6, 1 (2009); P. Richardt et al., *Inorg. Chem.* 40, 703 (2001); and S. Uchida et al., *J. Am. Chem. Soc.* 130, 12370 (2008).

Heteropolyacids make up a subgroup of POMs and usually form either the Keggin or the Dawson structure, between 1-2 nm in diameter, as shown in FIG. 1. The Keggin has a chemical formula of $[H_nXM_{12}O_{40}]$. It is composed of a IVB-VIB transition metal (M commonly V, Nb, Mo, or W) oxide outer shell and a single 4A-5A element (X commonly P or Si) at the core. The surface possesses either 3 or 4 hydroxyl groups depending on the choice of the central atom whether phosphorous or silicon.

The acidic character of heteropolyacids offers the potential to promote cationic homopolymerization of epoxy resins yielding novel epoxy nanocomposite materials. Bednarek et al. showed that heteropolyacids may be used to promote cationic ring opening polymerization reactions of cyclic ether species over two decades ago. See M. Bednarek et al., *Die Makromol. Chem.* 190, 929 (1989). Only recently have others reported the use of heteropolyacids to catalyze epoxy cure reactions. See Q. Wu et al., *Colloid Polym. Sci.* 286, 761 (2008); and Y. Yu et al., *Polymer* 51, 1563 (2010). Heteropolyacids are soluble in water and many protic and aprotic polar solvents and will disassociate to varying degrees depending on the solvent basicity. See R. S. Drago et al., *J. Am. Chem. Soc.* 119, 7702 (1997). Heteropolyacids also form salt complexes with alkali metals and many organoamines. See Y. Izumi et al., *Appl. Catal. A* 132, 127 (1905); A. G. Sathicq et al., *Tetrahedron Lett.* 49, 1441 (2008); and W. Zhang et al., *Green Chem.* 13, 832 (2011).

The present invention is directed to a method to synthesize polyoxometalate-loaded epoxy composites. The method comprises adding a polyoxometalate to an epoxy resin and applying an external stimulus to release the acid from the polyoxometalate and thereby catalyze the cure reaction of the epoxy resin. The polyoxometalate can comprise an isopolyacid, heteropolyacid, or molybdenum compound. For example, the heteropolyacid can comprise a Keggin structure or a Dawson structure. For example, the heteropolyacid can comprise a phosphotungstate, silicotungstate, phosphomolybdate, silicomolybdate, lacunary structure thereof, or a transition metal, organo-metal, and silane type substituted derivative thereof. The epoxy resin preferably has a $pK_a$ greater than 7. For example, the acid-catalyzed epoxy resin can comprise N,N-diglycidyl-4-glycidyloxyaniline resin. For example, the external stimulus comprises a photo or thermal stimulus.

As an example of the present invention, a phosphotungstate heteropolyacid was used to catalyze the cationic homopolymerization of a N,N-diglycidyl-4-glycidyloxyaniline epoxy resin to form a polyoxometalate-loaded epoxy composite. The catalytic activity was studied by isothermal differential scanning calorimetry. An epoxy hardener is not added to the epoxy resin, leaving cure of the resin solely dependent on the POM concentration. The cure kinetics depends on POM concentration and temperature. A cure reaction kinetic model is described below in terms of the ACE and AM mechanisms.

Preparation of an Exemplary Polyoxometalate-Loaded Epoxy Composite

Figure 2:
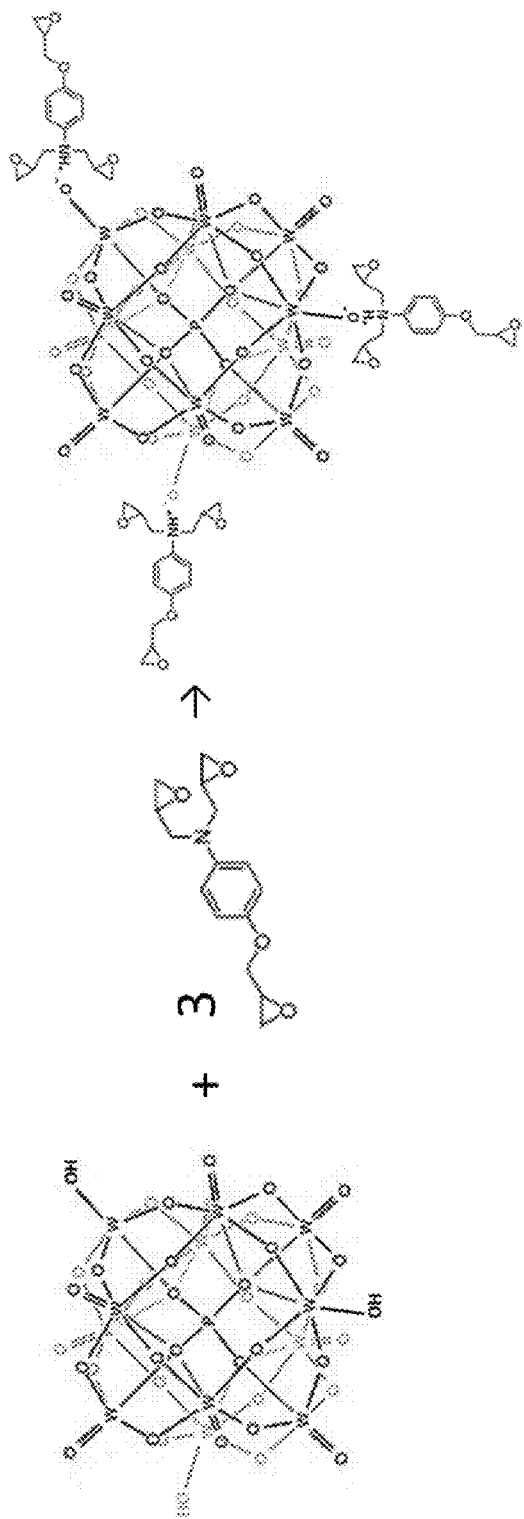
FIG. 2 shows the formation of an epoxy-POM complex.

Phosphotungstate (PTA) is a Keggin POM with the formula $H_3PW_{12}O_{40}$. Hydrated PTA was heated to 250° C. under vacuum for 24 hrs to dehydrate the PTA. The dehydrated PTA was added to the resin and mechanically blended to assist in breakup of the PTA clusters leading to dispersion of the PTA in the resin. Dispersion of PTA in the resin afforded PTA-resin complex formation. Disassociation of the PTA surface hydroxyls leads to protonation of the resin tertiary amine forming a quaternary amine that forms a complex with the PTA anion. The PTA is able to complex with three resin molecules through three disassociating surface hydroxyls, as shown in FIG. 2. The complex can then be solubilized by the remaining uncomplexed resin. After dispersion, the resin was heat cured.

Figure 3:
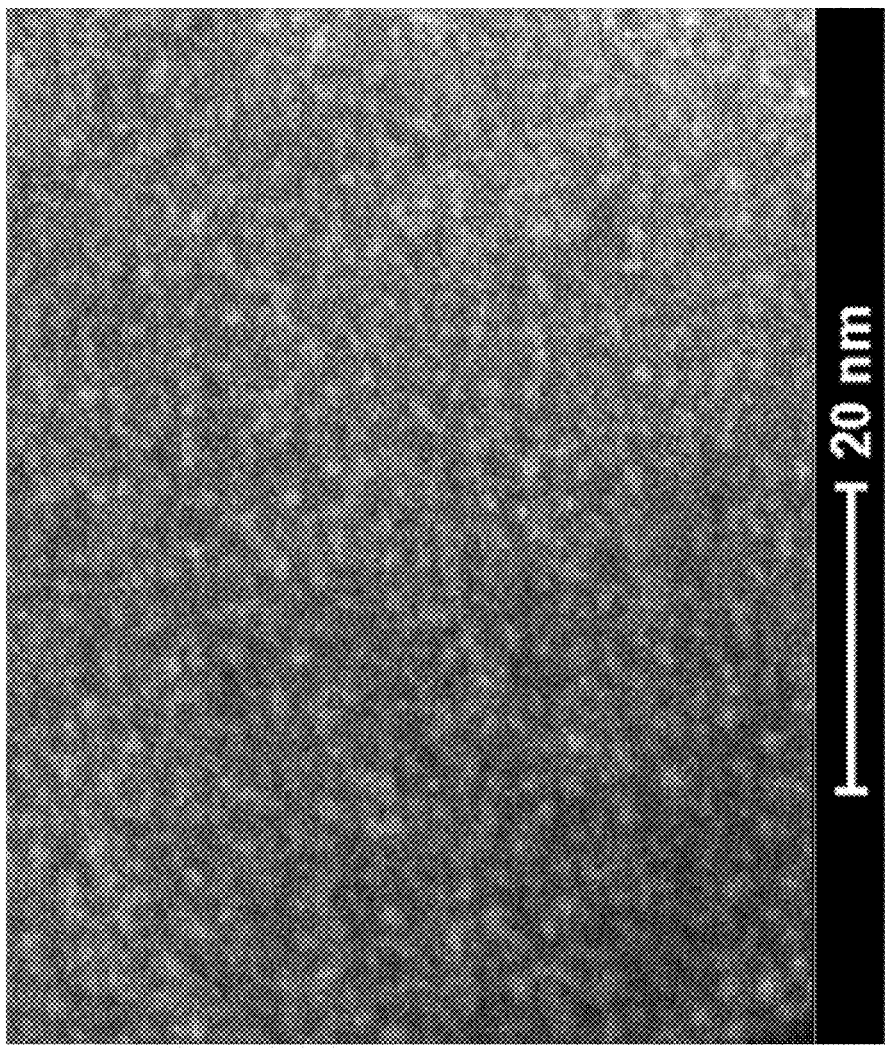
FIG. 3 is a TEM image of a cured PTA-epoxy nanocomposite. Bright spots are identified as individual PTA.

The state of the dispersion was evaluated by transmission electron microscopy (TEM). A wedge of cured resin was cut from the cured PTA nanocomposite by focused ion beam (FIB). FIB specimens were prepared in a dual-beam, field emission SEM and Ga focused ion beam system. High-angle annular dark-field (HAADF) scanning transmission electron micrographs were acquired with a TEM/STEM operated at 300 kV and equipped with a field emission electron source. The HAADF image shows particles composed of higher atomic number elements like PTA as bright on a lower atomic number background such as the cured epoxy matrix. As shown in FIG. 3, single particle resolution was obtained from the thinnest regions of the FIB specimen. A comparison of the size of the bright spots to the micrograph length scale gives a size of a little more than a nanometer which is the size of a single PTA particle.

Figure 4:
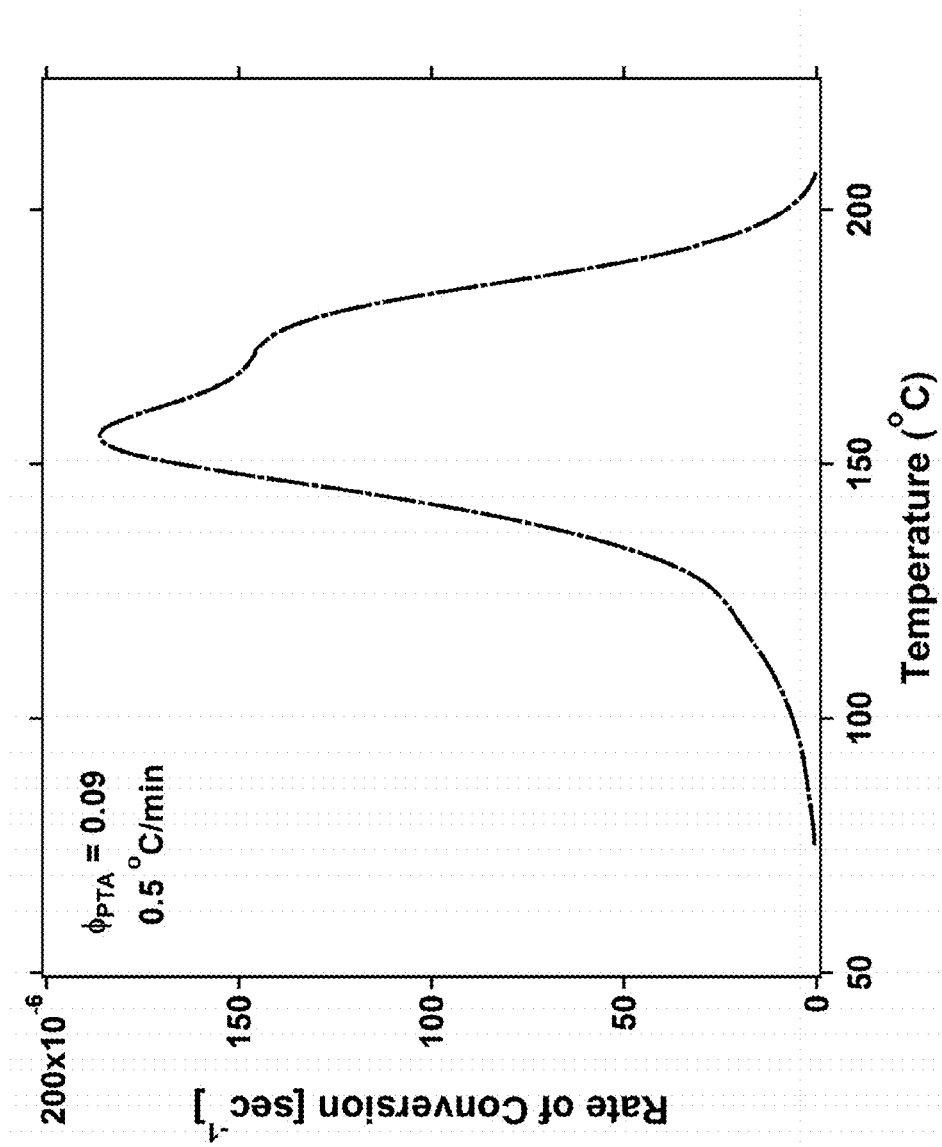
FIG. 4 is a graph of the rate of conversion of N,N-diglycidyl-4-glycidyloxyaniline resin with a PTA volume fraction of 0.09 determined from the cure exotherm measured by a dynamic DSC thermal ramp at 0.5° C./min.

The extent of conversion was followed by differential scanning calorimetry (DSC) measurement of the cure exotherm. Measurements were performed on a DSC instrument in sealed aluminum hermetic pans. An initial dynamic DSC thermal ramp at 0.5° C./min provided understanding of the rate of conversion of the epoxy with respect to temperature. The extent of conversion was determined from a running integration of the dynamic cure exotherm with respect to temperature normalized by the total area of the exotherm. The rate of conversion was then determined from the derivative of the extent of conversion with respect to time. A plot of the rate of conversion versus temperature for epoxy resin with a PTA volume fraction of 0.09 is shown in FIG. 4. The two peaks in the rate of conversion identify two cure mechanisms responsible for the crosslinking of the epoxy thermoset. The presence of two cure mechanisms makes a kinetic analysis of the dynamic DSC cure exotherm problematic and requires isothermal DSC to model the cure kinetics. See R. B. Prime, *Polym. Eng. Sci.* 13, 365 (1973).

Isothermal DSC measurement of the cure reaction exotherm were performed by rapid heat to the desired temperature and held at temperature until the cure exotherm returned to baseline. Isothermal temperatures covered the second peak in the rate of reaction with respect to temperature as shown in FIG. 4 to capture both cure mechanisms and avoid vitrification during cure. The samples were then cooled to 25° C. and reheated at a ramp rate of 0.5° C./min up to 225° C. to check for residual cure. The extent of conversion was measured by running integration of the exotherm in time normalized by the total area of the exotherm. The extent of cure was measured for four PTA volume fractions of 0.03, 0.05, 0.07, and 0.09 in the resin at four to five temperatures.

Cure Kinetics Model

The cure mechanism of Lewis acid catalyzed cationic homopolymerization of cyclic ethers is well established. See P. Kubisa and S. Penczek, *Prog. Polym. Sci.* 24, 1409 (1999); and L. Matejka et al., *J. Polym. Sci. Part A: Polym. Chem.* 35, 651 (1997). The cure mechanism occurs in two stages: initiation and propagation. Initiation consists of a fast equilibrium between inactive and active initiator species and a slow reaction of an active initiator with a glycidyl yielding an active propagating dimer species. For the PTA suspension in N,N-diglycidyl-4-glycidyloxyaniline, an equilibrium of disassociated PTA protons is rapidly established between protonation of the resin tertiary amine forming an inactive quaternary ammonium and protonation of a resin glycidyl forming an active secondary oxonium ion, Eq. (3).

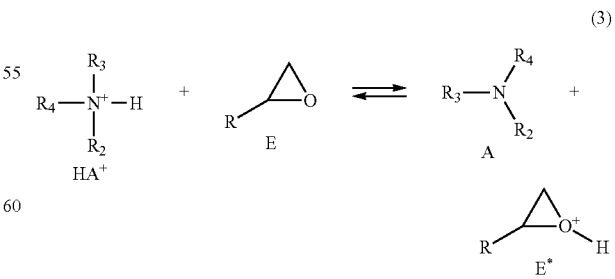

(3)

The initial concentration of secondary oxonium ions, E*, is determined by the equilibrium constant, $K_i$. The secondary oxonium ion reacts with a second glycidyl group, E, to form an active dimer, EE*, with a strained tertiary oxonium ion at the active end and an alcohol at the opposing end, Eq. (4).

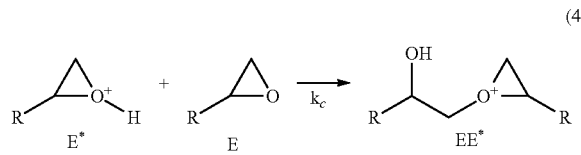

(4)

When rapidly heating the PTA-resin to temperature, the cure reaction initiates: By the time the environmental temperature stabilizes, the reaction has already begun to propagate. Therefore, initiation is not included in the present description of the PTA-resin isothermal cure kinetics and only propagation is considered.

The cure reaction propagates in the second stage through the ACE mechanism and AM mechanism.

The ACE mechanism is fast, and propagation occurs by reaction of the tertiary oxonium ions with remaining glycidyl groups forming an active propagating polymer chain, $E_nE^*$, Eq. (5).

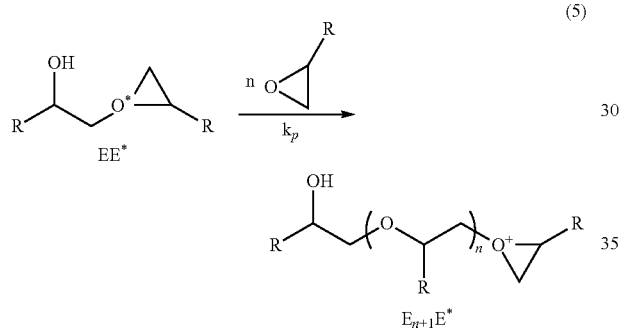

(5)

Reaction of a tertiary oxonium ion with a glycidyl does not consume the tertiary oxonium ion. The tertiary oxonium ion is reformed at the active end of the propagating polymer. The rate equation for ACE propagation is written as follows:

$$r_{ACE}=k_p(T)EP^+.$$ (6)

$r_{ACE}$ is the ACE rate of reaction; $k_p(T)$ is the ACE propagation rate constant; E is the glycidyl concentration; $P^+$ is the ACE propagating polymer concentration.

Following initiation, the number of ACE polymers is equal to the sum of all $E_nE^*$ species. The total number of $E_VE^*$ species is determined by the initial number of secondary oxonium ions converted to tertiary oxonium ions (disregarding for the moment the influence of termination and transfer reactions). The initial number of secondary oxonium ions is determined by the initiation equilibrium constant that determines the number of active initiator species. As a result, the concentration of ACE polymer is assumed to be proportional to the initial concentration of initiator through the equilibrium constant between inactive and active initiator:

$$P^+ = \sum_{n=1}^{\infty} E_nE^* \rightarrow I^* \propto K_i I_o.$$ (7)

I is the total initiator concentration of inactive, $HA^+$, and active, $E^*$, species. The initial initiator concentration, $I_o$, is defined as 3 times the PTA concentration since there are three disassociating protons per PTA. Concentration is defined in terms of the resin volume excluding the PTA volume. This assumption for the total concentration of ACE polymer is believed to hold true at the onset of the cure reaction, but will be affected by termination and transfer reactions. The influence of termination and transfer reactions will be described later.

The $I_o$ concentration is substituted for the ACE polymer concentration and the ACE propagation rate constant is renamed as $k'_p$:

$$r_{ACE}=k'_p(T)EI_o.$$ (8)

The AM mechanism is slow, and propagation occurs through reaction of the terminal alcohol group of the ACE polymer and secondary oxonium ions. The reaction creates a new terminal alcohol and yields a proton which feeds into initiation to reform a secondary oxonium ion.

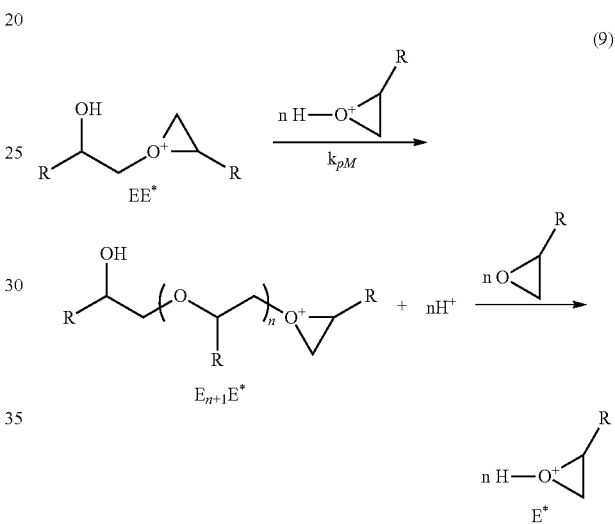

(9)

The rate equation for AM propagation is written as an AM propagation rate constant times the concentration of secondary oxonium ions times the alcohol concentration, $$r_{AM}=k_{pM}(T)E^*OH.$$ (10)

As the formation of a secondary oxonium is much faster than AM propagation, the secondary oxonium concentration is replaced by the glycidyl monomer concentration. The alcohol concentration is determined by initiation where an alcohol is formed for every secondary oxonium that reacts with a glycidyl group. Therefore, the alcohol concentration can be replaced by $I_o$ in a manner similar to the ACE polymer concentration, $$r_{AM}=k'_{pM}(T)EI_o.$$ (11)

The result is that both ACE and AM propagation are expected to be first order in the concentration of reactive glycidyl groups and first order in the PTA proton concentration. See P. Chabanne et al., *J. Appl. Polym. Sci.* 53, 769 (1994).

Termination and transfer reactions limit ACE propagation and have been confirmed to be active in ACE epoxy propagation reactions. See S. Penczek et al., *Makromol. Chem., Macromol. Symp.* 3, 203 (1986). An example termination reaction is attack of an ether oxygen by a tertiary oxonium to form a nonstrained tertiary oxonium that does not participate in ACE propagation. An example transfer reaction is end biting of the hydroxyl terminus of an ACE polymer by the tertiary oxonium of a second ACE polymer consuming a tertiary oxonium and liberating a proton. Termination and transfer reactions will cause a reduction in the concentration of ACE polymer and reduce the ACE rate of reaction.

Characterization of ACE Propagation

Figure 5:
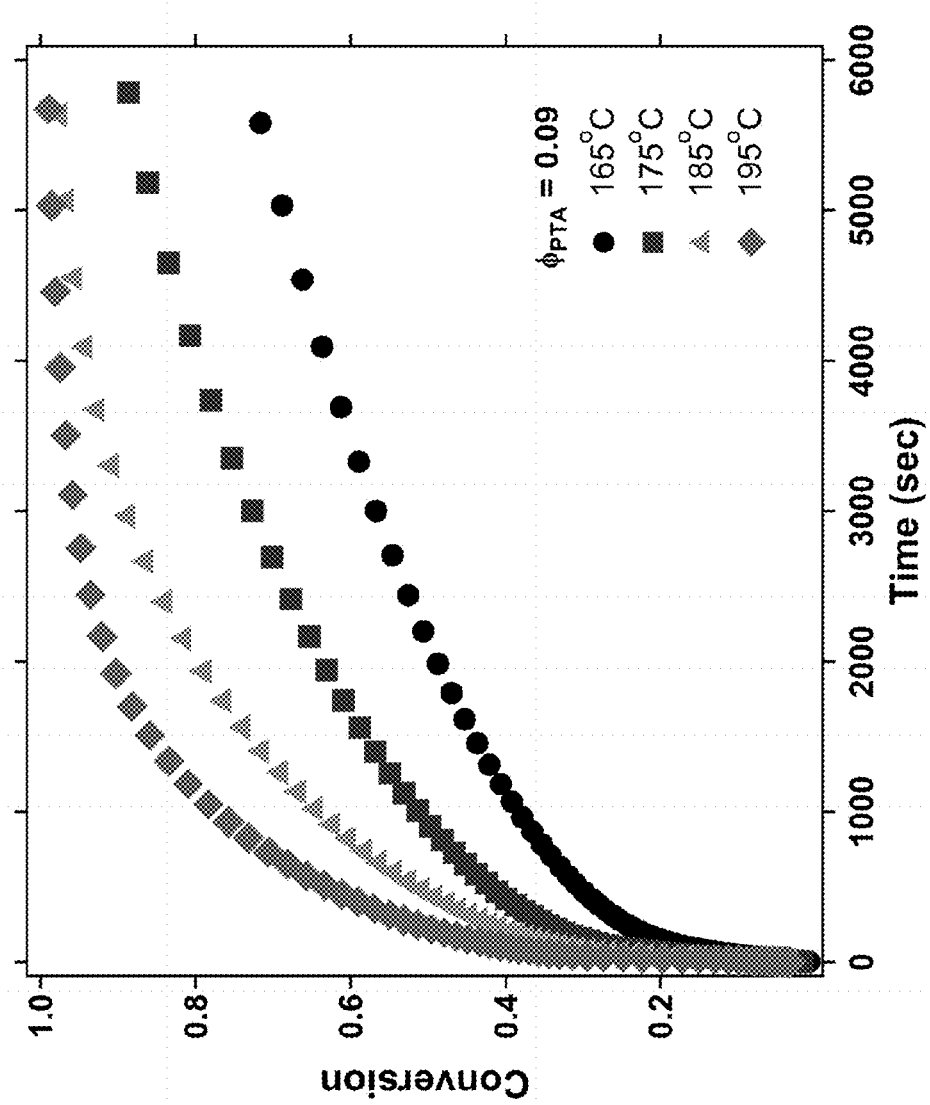
FIG. 5 is a graph of the conversion of reactive glycidyl groups as determined from the area of DSC measured exotherms for different isothermal cure temperatures with a PTA volume fraction of 0.09.

In FIG. 5, glycidyl conversion as determined from the area of DSC measured exotherms is plotted versus time for different isothermal cure temperatures of epoxy with a PTA volume fraction of 0.09. Two cure regimes are distinguished: a fast cure at short time that gives way to a slower cure at long time. See P. Chabanne et al., *J. Appl. Polym. Sci.* 53, 769 (1994). Based on past studies of cationic homopolymerization, the fast cure may be attributed to the ACE mechanism. The AM mechanism is arguably nonexistent at the onset of propagation since alcohols are formed only as tertiary oxonium ions are formed. Assuming first-order ACE kinetics in terms of the glycidyl concentration at short time, a linear relationship is expected between conversion and time at low conversion implying a constant rate:

$$\frac{dX_E}{dt} = r_{ACE} = k'_{p,o} e^{-E_{a,p}/RT} (1 - X_E) I_o. \qquad (12)$$

$X_E$ is the glycidyl fractional conversion; $k'_{p,o}$ is the pre-exponential factor of ACE propagation rate constant; $E_{a,p}$ is the ACE activation energy; R is the gas constant; T is temperature. An Arrhenius relation has been used to capture the temperature dependence of the propagation rate constant, $k_p'(T)$. According to Eq. (12), the ACE rate of reaction appears constant when $X_E$ is small.

Figure 6:
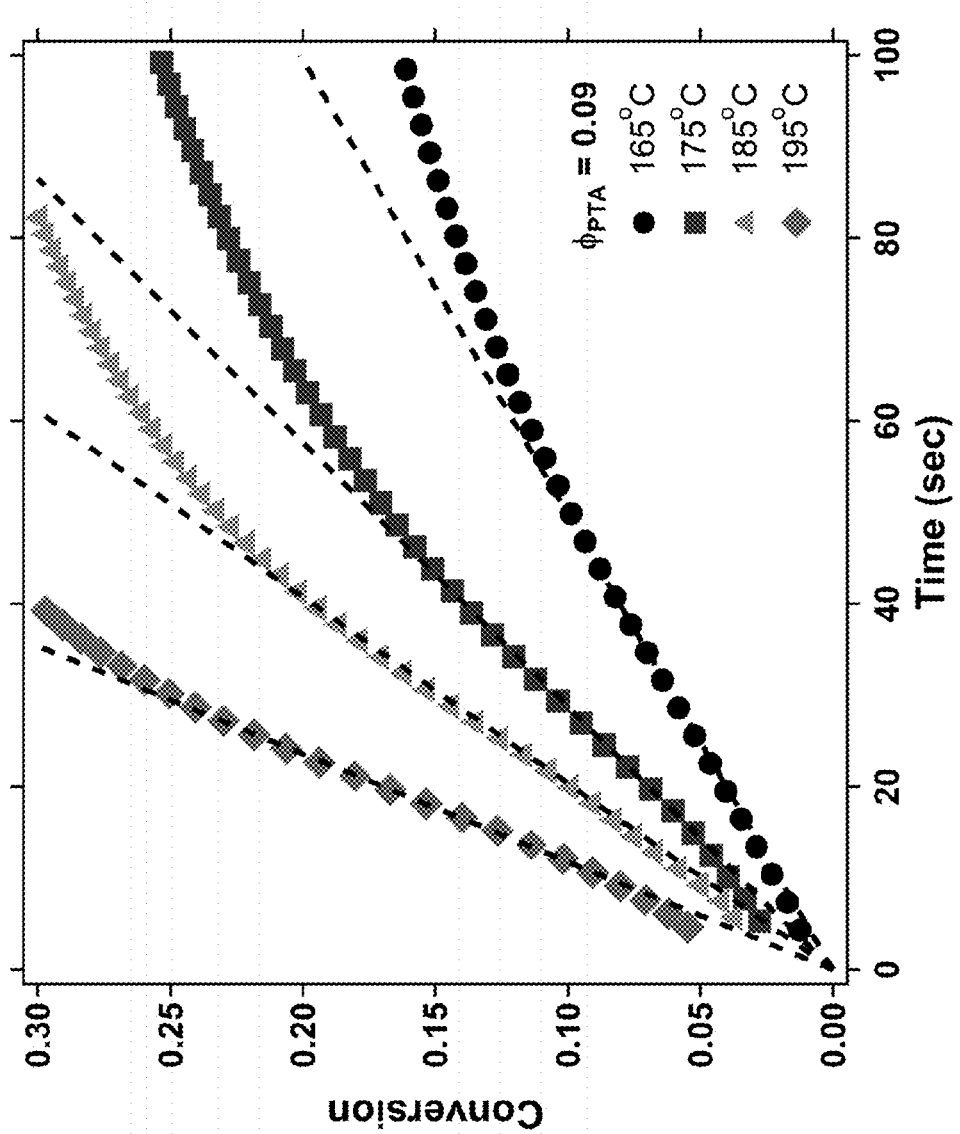
FIG. 6 is a graph of the conversion of reactive glycidyl groups at short time. At short time, a linear regime is identified where the rate of conversion is constant.
Figure 7:
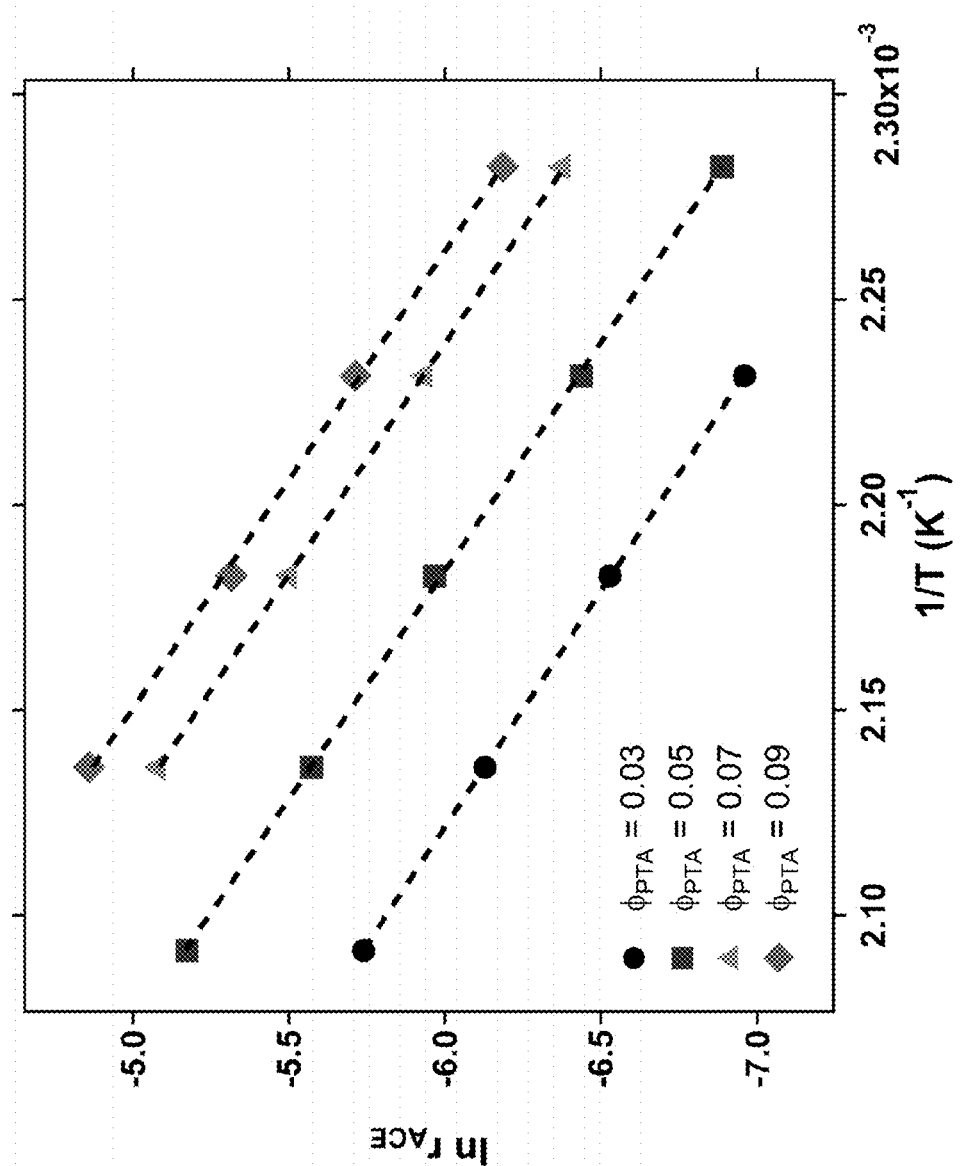
FIG. 7 is a graph of the natural logarithm of the initial rate of conversion determined from the short time linear regime plotted versus 1/T in an Arrhenius plot. The dashed line represents the best linear fit at a similar volume fraction and has a slope of $-E_{a,p}/R$.

In FIG. 6, an initial linear regime at short time is identified where the rate of conversion is constant. Initial conversion data points are ignored because they represent conversion that occurs when the DSC instrument is attempting to reach temperature. The dashed line shows the best linear fit. The rate of conversion is extracted from a linear best fit of the time dependent conversion data. The natural logarithms of the initial rates of conversion at an equivalent volume fraction are plotted versus 1/T in FIG. 7 to extract an activation energy for the short time propagation reaction. According to the ACE rate equation, a plot of the natural logarithm of the rate of reaction versus 1/T will have a slope of $-E_a/R$. Indeed, a linear relation is found for all four PTA volume fractions. The activation energies appear to be similar between the four PTA volume fractions (as shown in Table 1) implying that the activation energy is independent of the PTA concentration. The activation energy is an apparent activation energy since it also contains the enthalpy of the equilibrium between inactive and active initiator, yet the measurement does agree well with other measurements of epoxy systems that have been shown to initially propagate by the ACE mechanism. Chabanne et al. measured an activation energy of 70 kJ/mol for phenylglycidylether; Bouillon et al. measured an activation energy of 64 kJ/mol for phenylglycidyether/trioxane; and Mateva et al. determined an activation energy of 77 kJ/mol for phenylglycidylether/PEO. See P. Chabanne et al., *J. Appl. Polym. Sci.* 53, 769 (1994); N. Bouillon et al., *Die Makromol. Chem.* 191, 1417 (1990); and R. Mateva et al., *J. Polym. Sci. Part A: Polym. Chem.* 26, 511 (1988).

Figure 8:
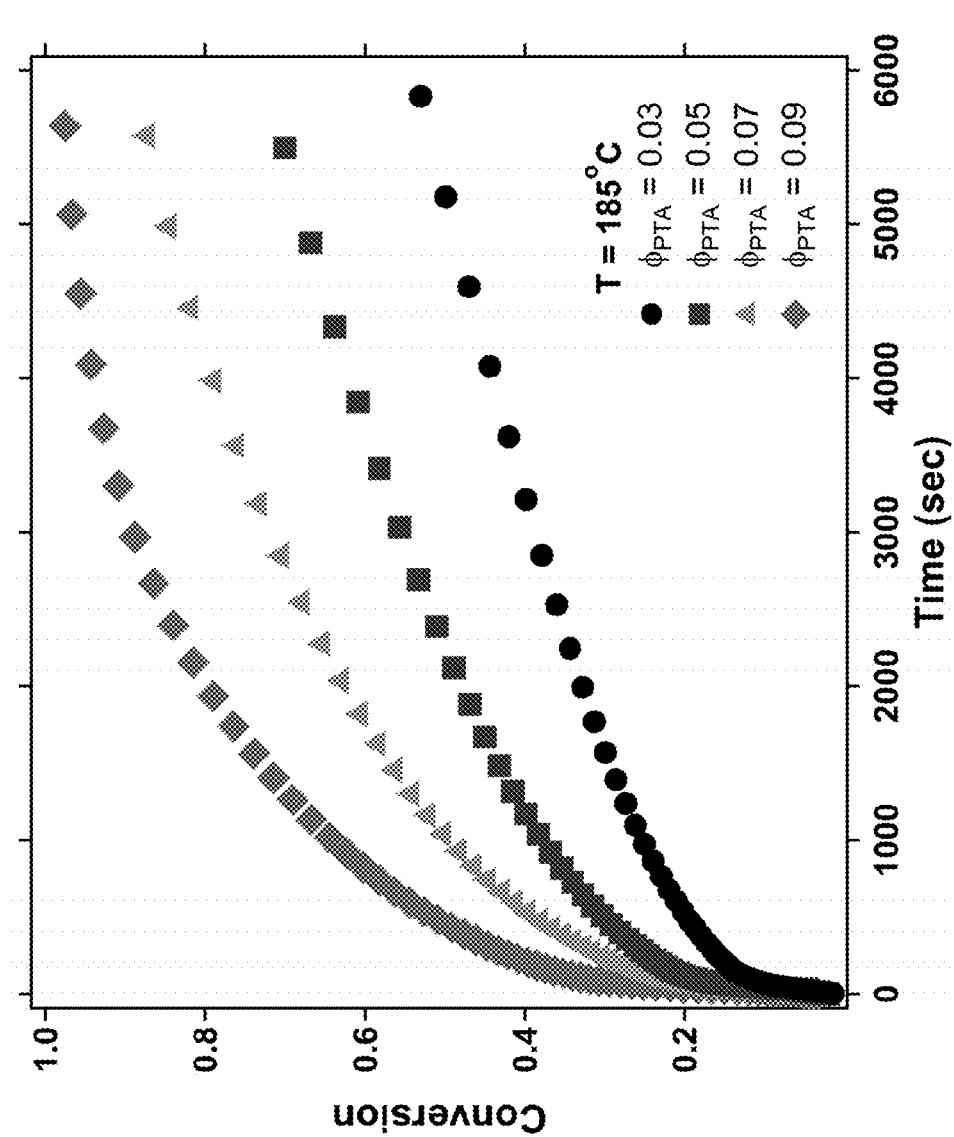
FIG. 8 is a graph of the conversion of reactive glycidyl groups as determined from the area of DSC measured exo
Figure 9:
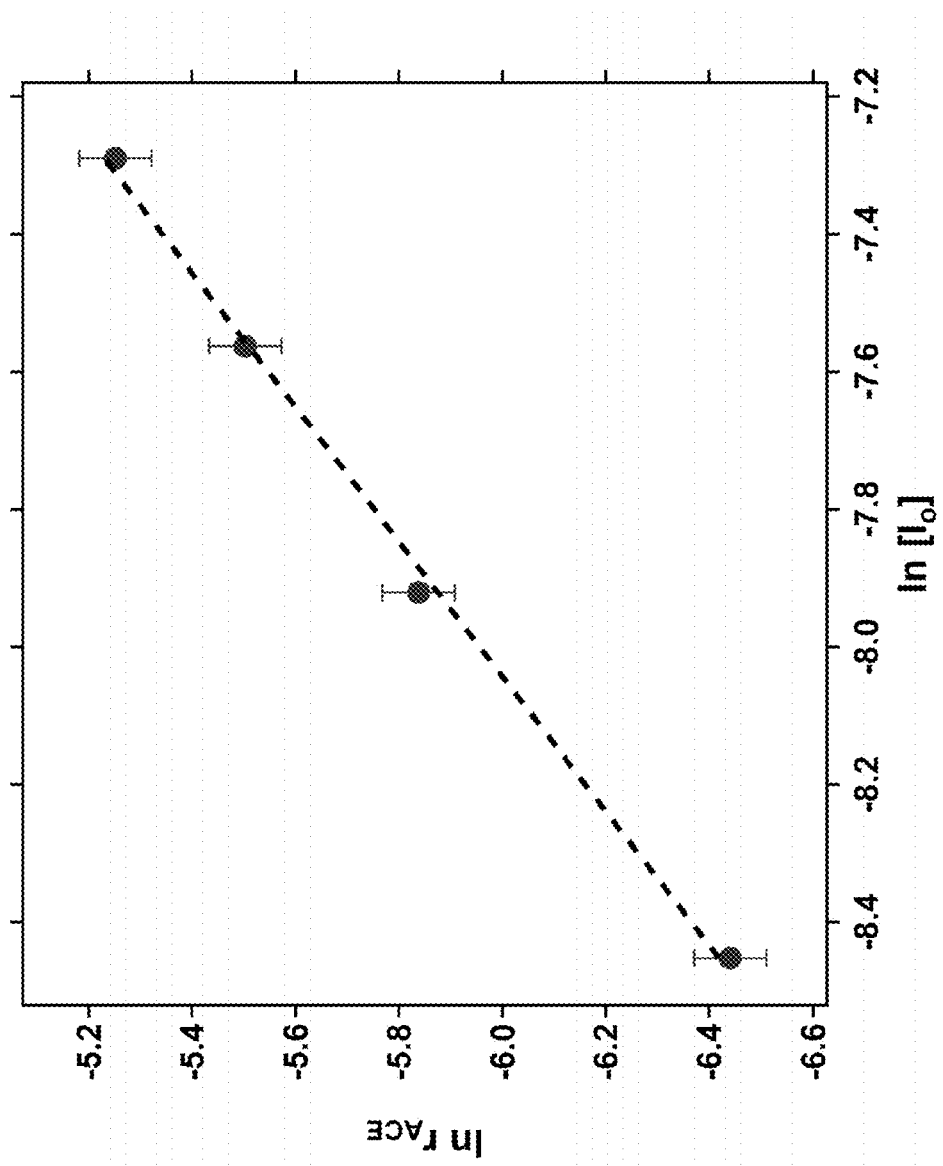
- FIG. 9 is a graph of the natural logarithm of the initial rate of conversion determined from the short time conversion linear regime plotted versus the natural logarithm of the initiator concentration at an isothermal cure temperature of 185° C.

In addition, the influence of the PTA concentration on the short time fast cure regime was studied. According to the ACE mechanism, the rate is expected to be first order in the $I_o$ assuming a constant proportionality between the number of ACE polymer in the propagation reaction and the total concentration of active and inactive initiator. In FIG. 8, conversion is plotted versus time at a constant temperature of 185° C. for four PTA volume fractions. The slope of the initial linear regime representing the initial constant rate of conversion is extracted. The natural logarithm of the rate is plotted versus the natural logarithm of the initial initiator concentration in FIG. 9. The data points are expected to be linear with a slope of unity (n=1 in Eq. (13)) according to the ACE rate equation, Eq (8).

$$r_{ACE} = k'_p(T)(1 - X_E) I_o^n \qquad (13)$$

$$\ln[r_{ACE}] = n\ln[I_o] + \ln[k'_{p,o} e^{-E_{a,p}/RT} (1 - X_E)].$$

A slope of 1.02 is extracted from the dashed line linear fit which agrees with the expectation of n=1 for a first order dependence on the initial initiator concentration.

From the intercept of the best fit line, the pre-exponential factor was calculated to be $2.2 \times 10^9$ cm$^3$/sec. mol using an activation energy of 73.5 kJ/mol from the mean of the activation energies shown in Table 1 determined from the Arrhenius plots of the four PTA volume fractions from the variable isothermal temperature measurements. Since the initial cure reaction is first order in $I_o$, a pre-exponential factor is calculated from the intercept of the Arrhenius plots of the constant PTA variable temperature measurements as well (Table 1). The pre-exponential factors from the constant PTA variable temperature measurements are found to be of the same magnitude and of a similar value to the pre-exponential from the constant temperature variable PTA measurement.

TABLE 1

Kinetic parameters for the short time cure according to the ACE mechanism.

| φPTA | $E_{a,1}$ [kJ/mol] | $E_{a,2}$ [kJ/mol] |
| --- | --- | --- |
| 0.03 | 71 | 88 |
| 0.05 | 75 | 90 |
| 0.07 | 74 | 89 |
| 0.09 | 73 | 93 |

Characterization of AM Propagation

The second slower cure regime is attributed to the AM mechanism. In order to characterize the cure kinetics of the slow cure regime, a material balance on the glycidyl concentration is written as the sum of the ACE and AM propagation rate equations expected to characterize the fast and slow cure regimes, $$\frac{dE}{dt} = -k_p E P^+ - k_{pM} E^* \mathrm{OH}. \qquad (14)$$

The propagation of the ACE mechanism has been shown to be affected by termination and transfer reactions which reduce the concentration of the propagating ACE polymer. The termination and transfer reactions are complex, and a first principles derivation of a kinetic model is non-trivial; therefore, a first-order termination reaction that consumes the ACE polymer is assumed for simplicity. Integration of a material balance on the ACE polymer gives the first order solution for the ACE polymer concentration as a function of time, $$\frac{dP^+}{dt} = -k_T P^+ \quad (15)$$

$$P^+ = I_o \exp[-k_T t].$$

The solution for the time dependence of the ACE polymer concentration is substituted into the material balance of the glycidyl concentration. The secondary oxonium concentration and alcohol concentration in the AM rate expression are replaced by the glycidyl and initial initiator concentration, respectively. Integration of the glycidyl material balance yields a solution for the glycidyl concentration as a function of time. The solution is easily written in terms of conversion, $$X_E = 1 - \exp[k'_p I_o (k_T^{-1} \exp[-k_T t] - k_T^{-1}) - k'_{pM} I_o t]. \quad (16)$$

Figure 10:
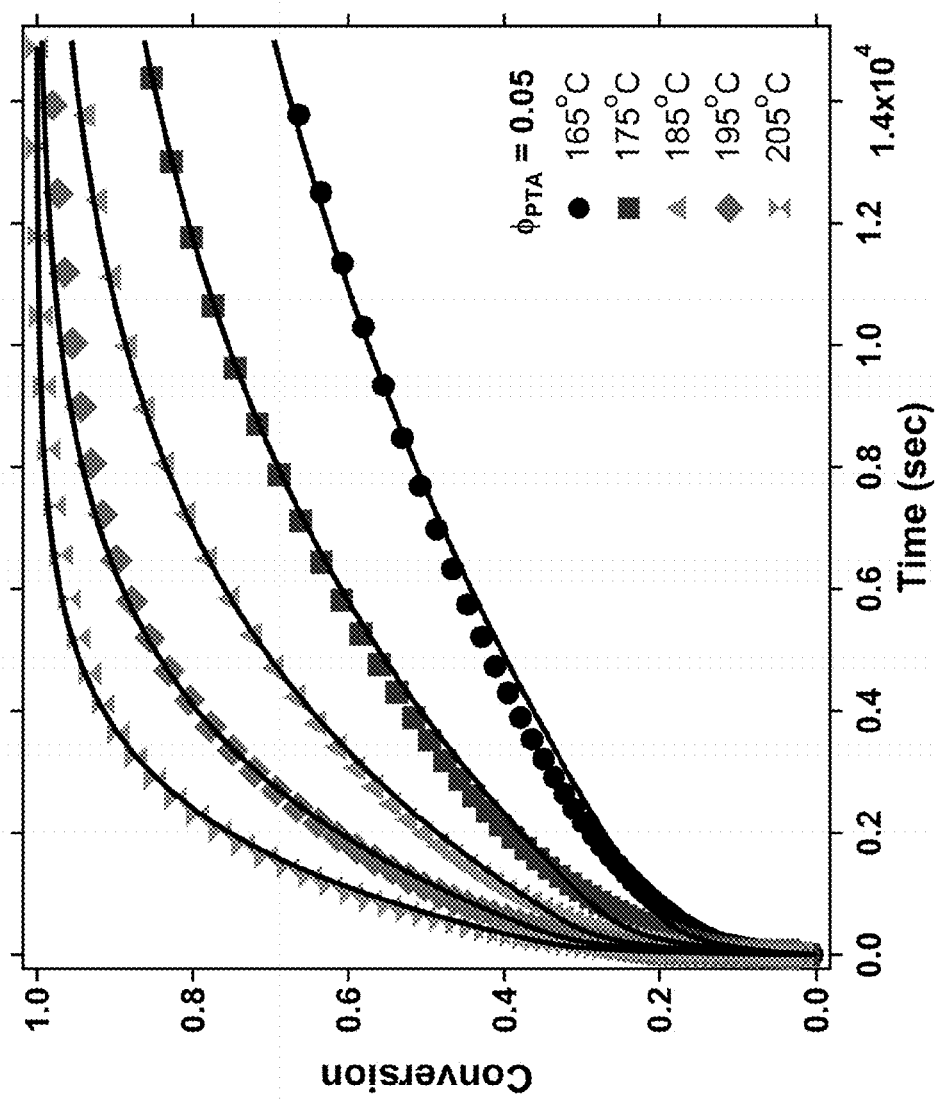
FIG. 10 is a graph of the conversion of reactive glycidyl groups as determined from the area of DSC measured exotherms versus time for different isothermal cure temperatures with a PTA volume fraction of 0.05.

The expression models reasonably well the fast and slow cure regimes shown by the solid lines in FIG. 10 for a PTA volume fraction of 0.05. Deviation from the model occurs in the transition between the two cure regimes. The transition is governed by termination and transfer reactions which have been modeled as a simple first order consumption reaction of the ACE polymer. The deviation shows that termination and transfer reactions are much more complex. Implementation of higher order kinetic models for the termination and transfer reactions did not improve the fit.

Figure 11:
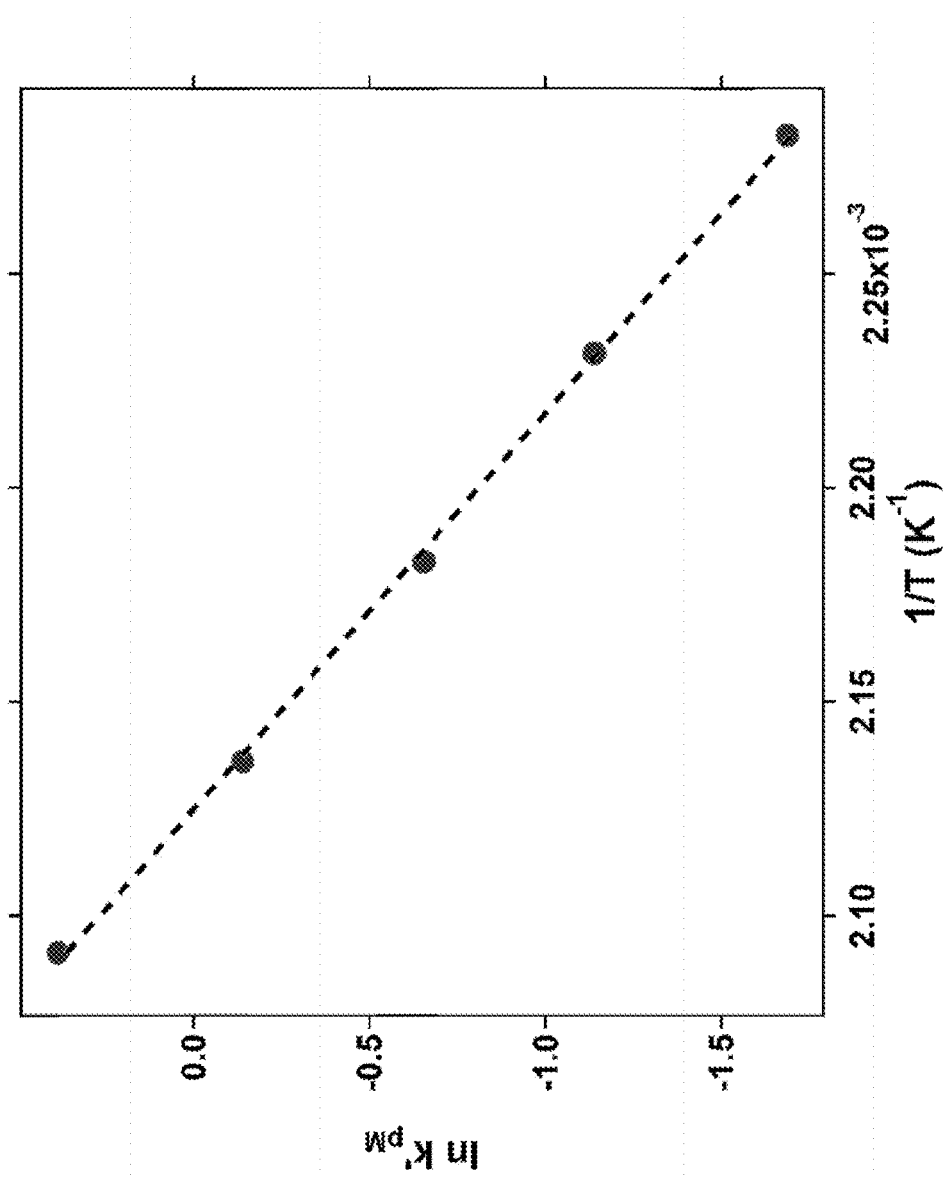
FIG. 11 is a graph of the propagation rate constant for the second cure regime at long time obtained from fitting conversion with Eq. (16) plotted versus 1/T in an Arrhenius plot for a PTA volume fraction of 0.05.

The propagation rate constant for the second cure regime, $k'_{pM}$ obtained from the fit is plotted versus 1/T in an Arrhenius plot to extract an activation energy, as shown in FIG. 11. The linearity of the data shows that the rate constant has an Arrhenius temperature dependence. The activation energies extracted from the Arrhenius plots of the fast and slow propagation rate constants from the best fits of the conversion data are shown in Table 2 for the four PTA volume fractions. The activation energies, $E_{a,1}$ for the fast propagation rate constant in Table 2 are similar to $E_{a,p}$ from the prior analysis of the fast cure regime according to the ACE mechanism in Table 1. The activation energies, $E_{a,2}$ for the slow propagation rate constant are also similar as the PTA volume fraction is varied. This supports that the slow cure mechanism remains unchanged by the PTA volume fraction. The values are similar to a previous measurement of the activation energy (89 kJ/mol) of diglycidyl ether of bisphenol A/butyl glycidyl ether/polyether triol system that propagates by the AM mechanism. See A. J. Ryan et al., *Polym. Bull.* 24, 521 (1990).

Figure 12:
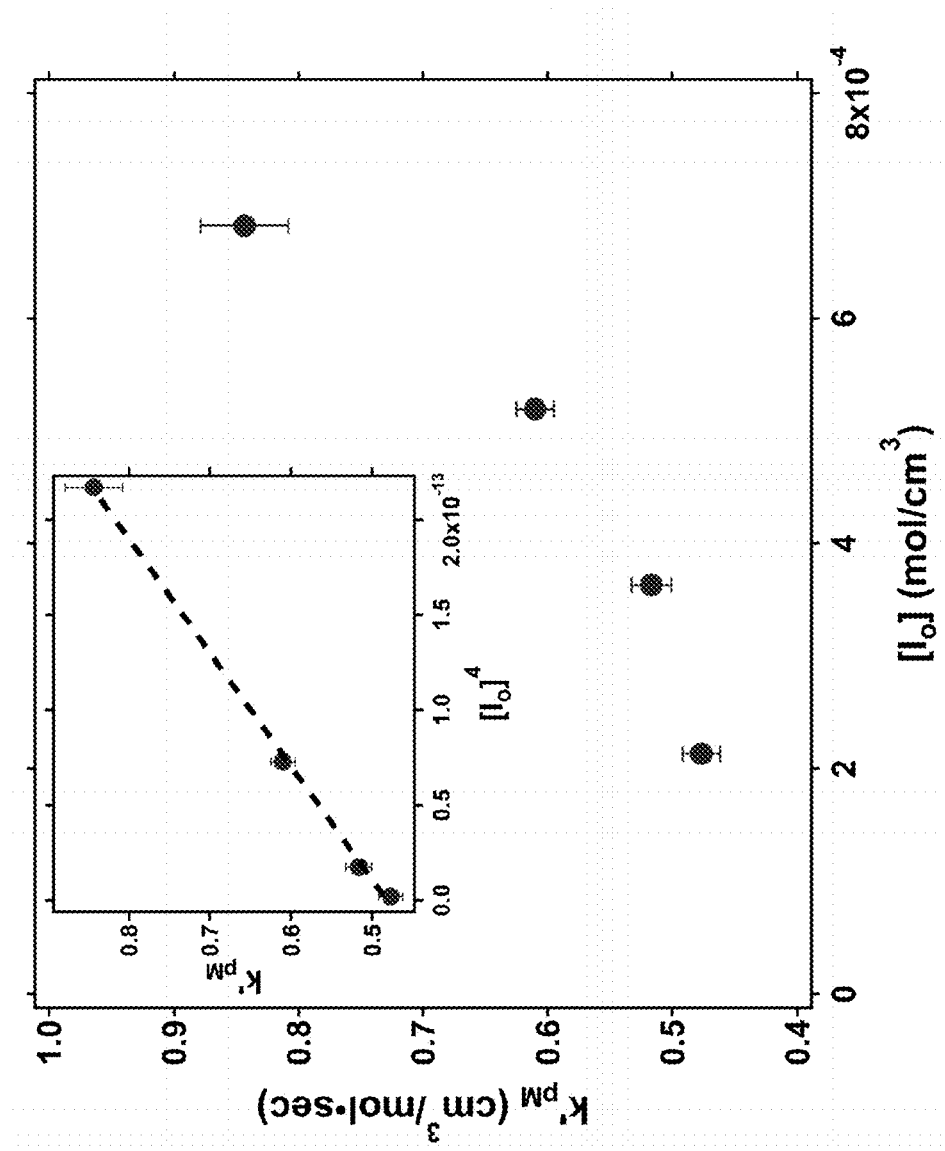
FIG. 12 is a graph of the propagation rate constant for the second cure regime at long time plotted versus the natural logarithm of the initiator concentration at an isothermal cure temperature of 185° C.

According to the AM mechanism, the cure reaction is expected to be first order in the secondary oxonium concentration and the alcohol concentration. It is assumed that the secondary oxonium concentration can be replaced by the glycidyl concentration, and the alcohol concentration can be replaced by the initiator concentration. If these assumptions hold, the reaction rate for the slow cure should appear to be first-order in the glycidyl concentration and the initiator concentration. The ability of the model to fit the slow cure regime at variable temperatures and constant PTA supports the first order dependence of the slow cure rate on the glycidyl concentration. In addition, the consistency of the activation energy for varying PTA volume fraction supports that the slow cure mechanism is unchanged as the initiator concentration is changed. It is then expected that the propagation rate constant for the slow cure regime should be constant, as the PTA concentration is changed at a single temperature. Instead the slow cure propagation rate constant is found to have a fourth-order dependence on the initiator concentration, as shown in FIG. 12. The result implies a fourth order dependence of the pre-exponential factor of the slow cure propagation rate constant with respect to $I_o$ since the activation energy of the slow cure is constant (Table 2). The pre-exponential factor describes the efficiency of the transition state, as the alcohol and secondary oxonium react to form an ether linkage and release a proton. A fourth-order dependence of the pre-exponential on $I_o$ may imply that either the proton concentration or the PTA anion concentration is improving the efficiency of the transition state toward the polymerized product.

An alternative explanation of the fourth-order dependence is a breakdown of the assumption that the alcohol concentration is determined by $I_o$. This could imply a shift in the equilibrium between inactive and active initiator. Yet, the initiator equilibrium was previously shown to not be affected by the amount of PTA. The analysis of the fast cure regime according to the ACE mechanism found a linear relation between $I_o$ and the tertiary oxonium concentration as the PTA volume fraction is increased. The same linear relation must hold true for the alcohol concentration since it is a product of initiation as is the tertiary oxonium concentration.

TABLE 2

Activation Energies from Arrhenius plots of $k'_p$ and $k'_{pM}$ obtained from fitting Eq. (16) to glycidyl conversion data.

| φPTA | $E_{a,1}$ [kJ/mol] | $E_{a,2}$ [kJ/mol] |
|---|---|---|
| 0.03 | 71 | 88 |
| 0.05 | 75 | 90 |
| 0.07 | 74 | 89 |
| 0.09 | 73 | 93 |

In summary, the cure reaction propagates through two cure regimes. A fast cure at short time is identified as propagation by an ACE mechanism. A slow cure at long time is identified as propagation by an AM mechanism. The activation energies for the fast and slow cure regimes agree well with other systems that have been confirmed to propagate by the ACE and AM mechanisms.

Propagation by the ACE mechanism proceeds to higher levels of conversion as the PTA loading is increased. This can be attributed to an increase in the concentration of initiator which translates into a greater concentration of ACE polymer allowing the reaction to proceed to higher levels of conversion before termination and transfer reactions begin to significantly hinder ACE propagation. Termination and transfer reactions consume the ACE polymer leading to a dramatic reduction in the rate of propagation by the ACE mechanism. The result is a shift of the cure reaction to the AM mechanism. The AM mechanism is slower than the ACE mechanism as shown by a larger activation energy for the slow cure regime.

The ACE pre-exponential is not significantly affected by the concentration of PTA showing that an increase in PTA does not cause a dramatic shift in the equilibrium between inactive and active initiator. Increases in PTA give a linear increase in active initiator since the pre-exponential is unchanged. The result implies a strong affinity of the amine for the proton compared to the glycidyl such that the majority of the protons are associated with the amine. The linear increase is likely assisted by the large amount of resin amines and glycidyls compared to acidic protons (between 1-2 orders of magnitude more depending on the PTA concentration)

such that the equilibrium between active and inactive initiator is not shifted significantly by an increase in the PTA concentration.

The present invention has been described as a method of synthesis of polyoxometalate-loaded epoxy. It will be understood that the above description is merely illustrative of the applications of the principles of the present invention, the scope of which is to be determined by the claims viewed in light of the specification. Other variants and modifications of the invention will be apparent to those of skill in the art.

I claim:

1. A method of synthesis of polyoxometalate-loaded epoxy, comprising:
    adding a polyoxometalate to an epoxy resin, wherein the polyoxometalate comprises a heteropolyacid having a Dawson structure having a chemical formula $[H_nX_2M_{18}O_{62}]$, wherein X is a 4A-5A element and M is a IVB-VIB transition metal; and
    applying an external stimulus to release the acid from the polyoxometalate and thereby catalyze the cure reaction of the epoxy resin.

2. The method of claim 1, wherein M is V, Nb, Mo, or W.

3. The method of claim 1, wherein X is P or Si.

4. The method of claim 1, wherein the polyoxometalate is complexed with an organic base.

5. The method of claim 1, wherein the epoxy resin has a $pK_a$ greater than 7.

6. The method of claim 5, wherein the epoxy resin comprises N,N-diglycidyl-4-glycidyloxyaniline resin.

7. The method of claim 1, wherein the external stimulus comprises a photo or thermal stimulus.

* * * * *